United States Patent
Shah

(10) Patent No.: US 7,774,414 B2
(45) Date of Patent: Aug. 10, 2010

(54) BLIND NOTIFICATION OF E-MAIL FORWARDING

(75) Inventor: Tushar Ramesh Shah, Lombard, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1035 days.

(21) Appl. No.: 11/296,540

(22) Filed: Dec. 7, 2005

(65) Prior Publication Data

US 2007/0130329 A1    Jun. 7, 2007

(51) Int. Cl.
G06F 15/16     (2006.01)

(52) U.S. Cl. .................. 709/206; 709/224; 709/207

(58) Field of Classification Search .......... 709/206, 709/207, 224
See application file for complete search history.

(56) References Cited

U.S. PATENT DOCUMENTS

| | | | | |
|---|---|---|---|---|
| 5,630,060 | A * | 5/1997 | Tang et al. ................ | 709/238 |
| 6,014,688 | A * | 1/2000 | Venkatraman et al. ...... | 709/206 |
| 6,701,440 | B1 * | 3/2004 | Kim et al. ................... | 726/24 |
| 6,721,784 | B1 * | 4/2004 | Leonard et al. ............ | 709/206 |
| 6,751,670 | B1 * | 6/2004 | Patterson .................... | 709/229 |
| 6,823,368 | B1 * | 11/2004 | Ullmann et al. ............ | 709/206 |
| 7,076,353 | B2 * | 7/2006 | Ogata et al. ................ | 701/45 |
| 7,076,533 | B1 * | 7/2006 | Knox et al. ................ | 709/217 |
| 7,139,802 | B2 * | 11/2006 | Keohane et al. ............ | 709/206 |
| 7,149,893 | B1 * | 12/2006 | Leonard et al. ............ | 713/154 |
| 7,228,334 | B1 * | 6/2007 | Jordan, Jr. .................. | 709/206 |
| 7,457,842 | B2 * | 11/2008 | Heilmann .................. | 709/206 |
| 7,562,118 | B2 * | 7/2009 | Fellenstein et al. ......... | 709/206 |
| 2002/0055350 | A1 * | 5/2002 | Gupte et al. ................ | 455/412 |
| 2003/0233410 | A1 * | 12/2003 | Gusler et al. ................ | 709/206 |
| 2005/0010643 | A1 * | 1/2005 | Fellenstein et al. ......... | 709/206 |
| 2006/0020677 | A1 * | 1/2006 | von Koch .................. | 709/207 |
| 2007/0073816 | A1 * | 3/2007 | Kumar et al. ............... | 709/206 |
| 2007/0136430 | A1 * | 6/2007 | Qureshi et al. .............. | 709/206 |
| 2008/0098078 | A1 * | 4/2008 | Daniell ...................... | 709/206 |
| 2009/0077381 | A1 * | 3/2009 | Kanungo et al. ............ | 713/170 |

OTHER PUBLICATIONS

T. Hansen, G.Vaudreuil, Message Disposition Notification, May 2004, Networking Group, RFC 3798, pp. 1-29.*

* cited by examiner

Primary Examiner—Hassan Phillips
Assistant Examiner—Anthony Mejia
(74) Attorney, Agent, or Firm—Carmen Patti Law Group, LLC

(57) ABSTRACT

A notification message is sent back to the originator or an e-mail message whenever the e-mail message is subsequently forwarded on to a second addressee. New data fields in an RFC compliant message header are read by the e-mail programs handling the message, the fields identify the message originator as one that should have its subsequent retransmission notified to the originator.

18 Claims, 5 Drawing Sheets

PRIOR ART        10

| | |
|---|---|
| 12 | To: Email address(es) of primary recipient(s) |
| 14 | Cc: Email address(es) of secondary recipients(s) |
| 16 | Bcc: Email address(es) of blind carbon copies |
| 18 | From: Person or people who created the message |
| 20 | Sender: Email address of the actual sender |
| 22 | Received: Line added by each Message Transfer Agent along the path |
| 24 | Return-Path: Can be used to identify a path back to the sender |
| 26 | Date: The date and time the message was sent |
| 28 | Reply-To: Email address to which replies should be sent |
| 30 | Message-Id: Unique number for referencing this message later |
| 32 | In-Reply-To: message-id of the message to which this a reply |
| 34 | Keywords: User chosen keywords |
| 36 | Subject: Short summary of the message for the one-line display |

To: Email address(es) of primary recipient(s)

Cc: Email address(es) of secondary recipients(s)

Bcc: Email address(es) of blind carbon copies

From: Person or people who created the message

Sender: Email address of the actual sender

Received: Line added by each Message Transfer Agent along the path

Return-Path: Can be used to identify a path back to the sender

Date: The date and time the message was sent

Reply-To: Email address to which replies should be sent

Message-Id: Unique number for referencing this message later

In-Reply-To: message-id of the message to which this a reply

Keywords: User chosen keywords

Subject: Short summary of the message for the one-line display

42 X-From-Author: Person or people who originally created the message (may be different from "From" if forwarded message)

40 X-Forward-Notification: Forward Notification requested by the "From-Author" indicator

From: Joe@cfo.example.com
To: Mary@accounting.example.com
Date: Fri, 18 Nov, 2005 09:55:06 -0600
X-From-Author: Joe@cfo.example.com
X-Forward-Notification: Yes
Based on initial numbers, looks like our earnings are going to be 11 cents per share compared to analyst's expectation of 3 cents a share. Way to Go!!
Joe

102

From: Mary@cfo.example.com
To: Bob@sales.example.com
Date: Fri 18 Nov, 2005 09:55:06 -0600
X-From-Author: Joe@cfo.example.com
X-Forward-Notification: Yes
Check this out! Time to make serious money!!
To: Mary@accounting.example.com
From: Joe@cfo.example.com
Date: Nov 18th, 2005 10:30am

42 →
40 →

X-From-Author: Joe@cfo.example.com
X-Forward-Notification: Yes
Based on initial numbers, looks like our earnings are going to be 11 cents per share compared to analyst's expectation of 3 cents a share. Way to Go!!
Joe

104

To: Joe@accounting.example.com
Date: Fr9 18 Nov, 2005, 10:30:00 -0600

Your message to Mary@accounting.example.com was forwarded by Mary@accounting.example.com to Bob@sales.example.com at 09:55:06 -0600

FIG. 4

BLIND NOTIFICATION OF E-MAIL FORWARDING

TECHNICAL FIELD

The invention relates generally to data communications and more particularly to text messaging commonly known as electronic mail or "e-mail."

BACKGROUND

Text messages sent from one computer to another computer, and which pass through one or more computer networks or the Internet are commonly known as "e-mail" messages. As a form of communication, e-mail has both advantages and disadvantages. Its main attractions include its low cost and its relatively high transmission speed. An e-mail message can be sent to someone in another hemisphere as quickly and for the same cost as an e-mail message sent to someone across the street. A problem with e-mail, however, is the ease by which an e-mail message can be re-published or redistributed by the recipient. When e-mail messages are used to transmit copyrighted attachments, the re-transmission of such material can give rise to unauthorized distribution and copying.

It's well known that most e-mail programs are able to create and read e-mail messages such that when a message reaches its intended recipient or when it's read by its intended recipient, a return receipt message is sent from the message addressee to the message originator, notifying the originator that the message reached and/or was read by the addressee. While such return receipts provide an indication that the original message reached its intended addressee, they do not inform an e-mail message originator when an e-mail message has been forwarded by an original addressee to someone else. A method and/or apparatus for text messaging whereby a message originator would receive a notification when his or her message is forwarded by an addressee would be an improvement over the prior art in that such a capability would enable an e-mail message originator to know the extent to which a blind notification of forward message should be sent whenever the message is forwarded or retransmitted to someone other than the original addressee.

SUMMARY

In one embodiment, there is provided a method for notifying an e-mail message originator of an e-mail message's re-transmission by a first addressee to a second addressee. The method comprises the steps of formatting an e-mail message to include a forwarded message data field, which marks or identifies an e-mail message as requiring a notice message to be sent back to the message originator whenever the message is re-transmitted. A second field in the message identifies the originator's e-mail address to which a notification can be sent, notifying the originator that the message was forwarded to a second addressee.

In another embodiment, there is provided a computer that is coupled to a network interface, through which the computer can send and receive e-mail messages. The computer is also coupled to media that store computer program instructions, which when they are executed, they cause the computer to format an e-mail message to have at least one data field in the e-mail message header that indicates to a computer that receives the message, that a notification should be sent back to the computer from which the message originated. The computer program instructions also cause the computer to format an e-mail message to have at one other data field in the message that identifies the computer to which the notification message should be sent.

DESCRIPTION OF THE DRAWINGS

Features of exemplary implementations of the invention will become apparent from the description, the claims, and the accompanying drawings in which:

FIG. 1 is a representation of a prior art e-mail message header;

FIG. 2 is an exemplary embodiment of an e-mail message header to which two new fields are added by which a blind notification of forward message is sent back to the message originator whenever the message with the header is transmitted;

FIG. 4 shows example message headers including two new data fields and an example of a blind notification of forward message.

DETAILED DESCRIPTION OF THE PREFERRED EMBODIMENTS

Figure 3:
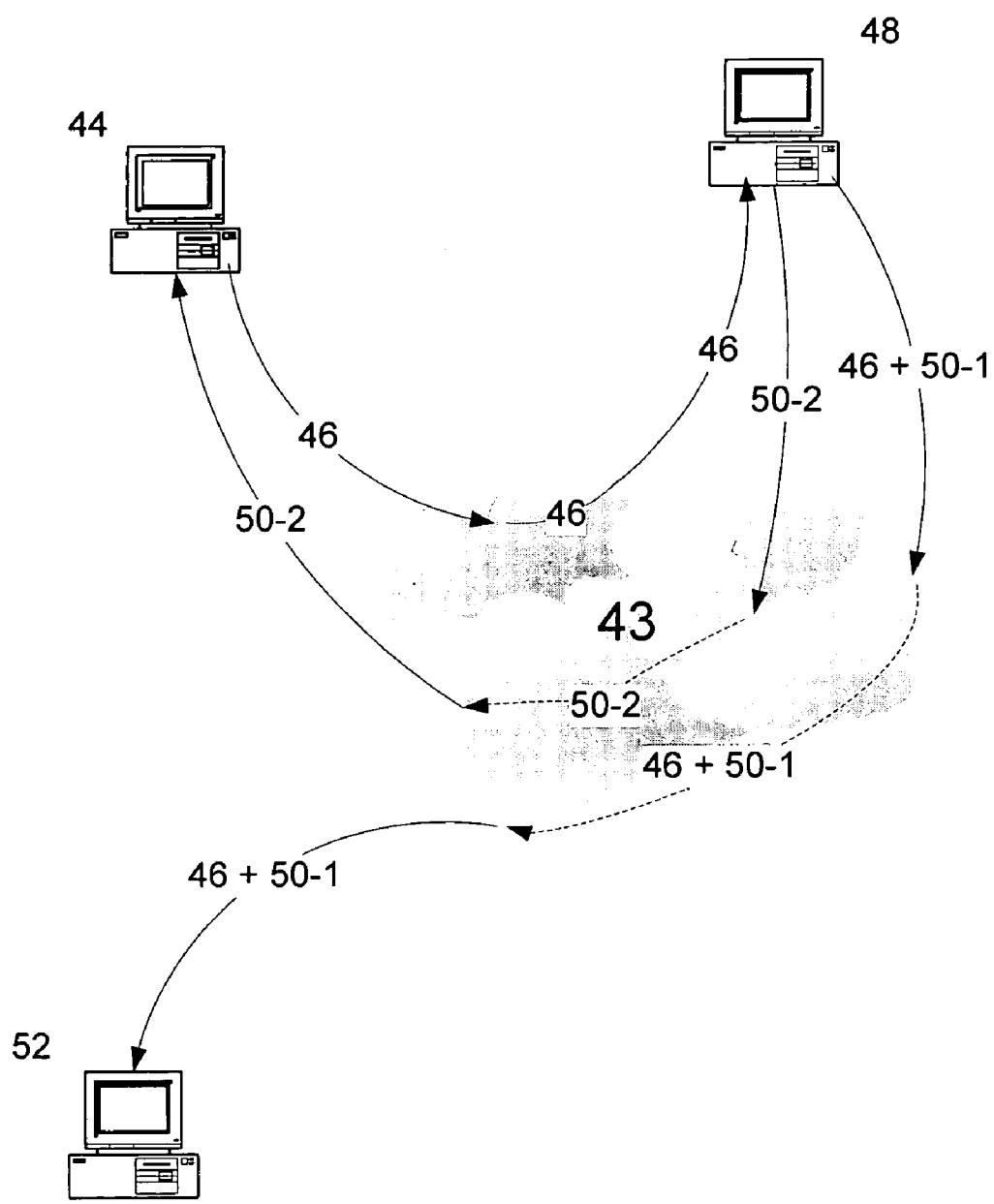
FIG. 3 is a representation of one implementation of a network that comprises several computers that are each coupled to a network through which text messages (e-mail) are routed.

Turning to FIG. 1 there is shown a prior art e-mail message header 10 compliant with section 2.2 of the Request for Comments (RFC) 2822 standard, which is the standard to which most e-mail programs conform when they create an e-mail message for transmission over the Internet. (As of the filing date, RFC 2822 can be obtained online at http://www.ietf.org/rfc/rfc2822.) As can be seen in the figure, the message header 10 has several different fields that are identified by reference numerals 12-36. The function of each field is also set forth in FIG. 1. Each field 12-36 is populated with ASCII characters. As is well known, e-mail messages all include a header 10 as part of the message and e-mail programs read the message header 10 fields to determine how to handle the message to which the header 10 is attached.

Message field 12 identifies the person or addressee to which the message is to be routed. Fields 14 and 16 identify addressees to which copies and blind copies are to be sent. Message field 18 identifies the e-mail address of the person who sent the message whereas message field 20 identifies the e-mail address of the person who created the message. Message field 22 contains the identity of each transfer agents (i.e., a switch or computer) that routed the message from the sender (identified in field 20) to the recipients (identified in fields 12, 14 and 16). Message field 22 can therefore grow or increase size as the message passes through a network and through successive transfer agents.

Message field 24 is a specification of transfer agents, i.e., computers or switches, through which a path can be traversed back to the sender, who is identified in the message field 18. Message fields 24-36 identify a message id, whether the message is a reply to an earlier message, keywords and a subject line of the message. Actual message text follows the header 10.

Turning now to FIG. 2 there is shown a blind notification of forward message header 100 compliant with section 2.2 of RFC 2822. Like the header 10 shown in FIG. 1, the header 100 shown in FIG. 2 is also attached to and becomes part of an e-mail message. E-mail programs, such as OUTLOOK®, read the header fields and determine from them, how to handle the message to which the header 100 is attached.

The message header 100 of FIG. 2 differs from the message header 10 of FIG. 1 by the addition of two new message fields 40 and 42. The first of these two new message fields 40 is a forwarded message notification data field 40, the contents of which marks or identifies the e-mail message to which the header 100 is attached to and forms a part of, as requiring the transmission of a blind notification of forward message back to the originator of the message. The second message field 42 identifies where a blind notification of forward message is to be sent to.

As used herein the term "blind notification of forward message" is considered to be an e-mail message sent back to a message originator by either a computer that forwarded the header 100 and its attached message, or a computer that received the header 100 and its attached message.

In most instances, the contents of the X-From-Author field will contain the same address as that which is in field 20, however, in an alternate embodiment, the presence of the forwarded message notification data field 40 in the header 100 can be used as a signal to a mail program that a blind notification of forward message should be sent to the address contained in field 20, which is shown in FIG. 1.

An illustrative depiction of how the message header 100 enables the blind notification of e-mail forwarding is in FIG. 3, which is a representation of one implementation of a network 300 comprised of several computers coupled to each other via a network 43, such as a local area network or LAN, a wide area network or WAN or the Internet and through which text messages (e-mail) are routed.

In FIG. 3, a first e-mail message 46 is created at a first computer 44 and formatted to have the aforementioned forwarded message notification data field 40 and the aforementioned second originating address field 42. The first e-mail message 46 is routed to and through a network 43 by which the first e-mail message 46 is delivered to a first addressee's computer 48, which is the addressee of the message specified in the "TO" message field 12 shown in FIG. 1 and FIG. 2.

If the addressee 48 of the message 46 forwards the first message 46 to a second addressee 52, as shown by the directed arrow labeled 46 +50-1, the preferred embodiment of the invention causes a blind notification of forward message 50-2 to be transmitted back to the originator 44, which notifies the originator that his first message 46 was sent on to a second addressee by the first addressee 48. The blind notification of forward message 50-2 is routed through the network 43 as any other e-mail message would be.

When the second addressee 52 receives the forwarded copy of the first e-mail message 46, with perhaps a preface message 50-1 from the first addressee 48, the second addressee does not necessarily know that the blind notification of forward message 50-2 was sent to the originator 44. Those of ordinary skill in the art will recognize that notice of the blind notification of forward message 50-2 transmission could easily be provided to either the first addressee 48, the second addressee 52 or both.

FIG. 4 shows an example of the message header 100 created by a mail program, which has a forwarded message notification data field 40 in the header 100. The message header 100 is sent when the person using an appropriately programmed e-mail program specifies on the user interface to send the message to have a forwarded message notification.

The message header 100 in FIG. 4 shows that the message originator, Joe, whose e-mail address is Joe@cfo.example.com, sent the message to Mary, who was the first addressee of the message. As shown in the header 100, Mary's e-mail address is: Mary@accounting.example.com.

FIG. 4 also shows an example of a message header 102 sent by an e-mail program running on Mary's computer, when Mary forwarded the message she received from Joe, to Bob.

FIG. 4 shows a blind notification of forward message, which is identified in FIG. 4 by reference numeral 104, which in one preferred embodiment, is sent by the e-mail program running on Mary's computer when that program causes the message she received from Joe, to be forwarded to Bob. In an alternate and equivalent embodiment, the blind notification of forward message can also be sent by the e-mail program running on Bob's computer when that program receives the forwarded message from Mary.

In the preferred embodiment, if the second addressee 52 re-forwards the first e-mail message 46 to yet another addressee not shown, the re-forwarding of the first e-mail message 46 causes another blind notification of forward message to be sent back to the originator.

While the embodiment shown in FIG. 3 depicts the transmission of a blind notification of forward message 50-1 to the originator 44 by the re-transmission of the first e-mail message 46 to a second addressee, an alternate and equivalent embodiment of the invention includes transmission of a blind notification of forward message by the computer of the second addressee 52 upon its receipt of the first e-mail message 46 from the first addressee 48. The difference between the preferred and alternate embodiments is which computer/addressee detects the forwarded address message field 40 and which computer/addressee acts to transmit the blind notification of forward message back to the originator.

Figure 5:
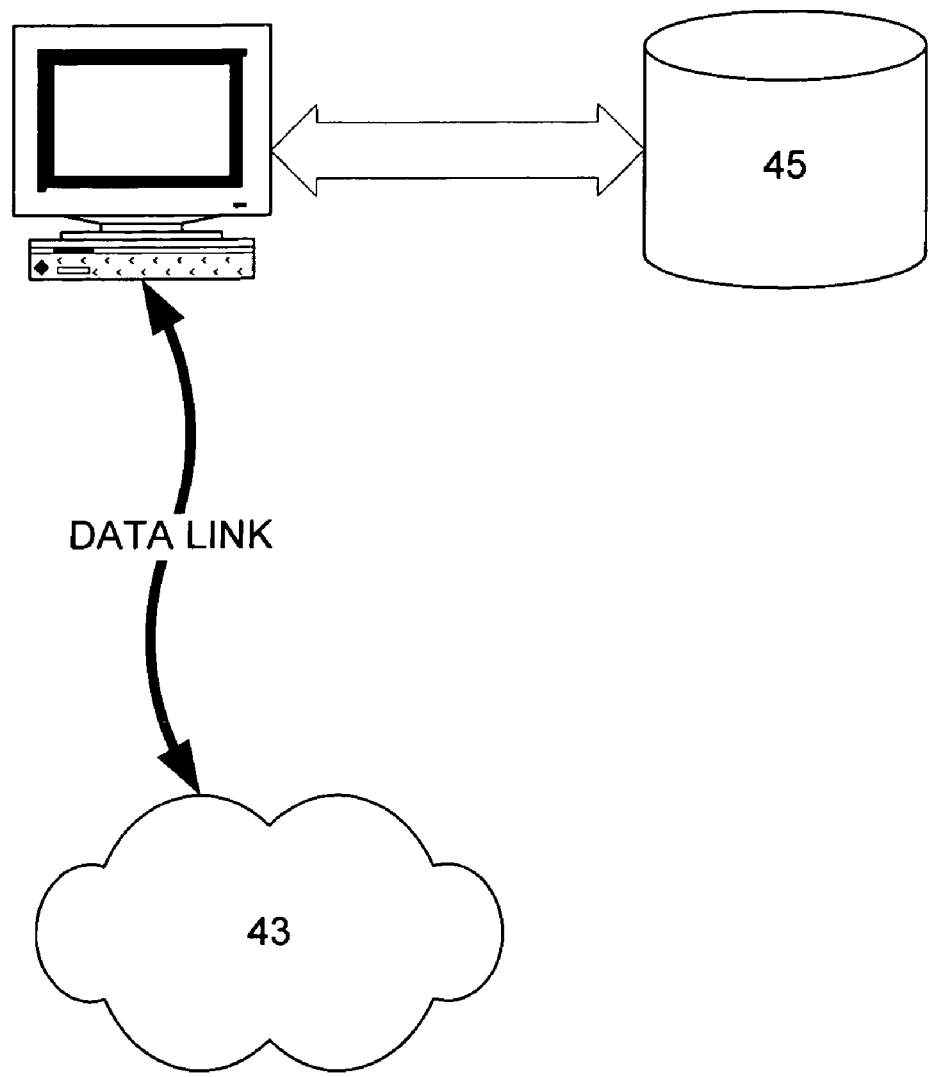
FIG. 5 depicts a computer and an associated storage media on which computer program instructions are stored, which when executed, imbue a computer to implement the various embodiments disclosed.

Those of ordinary skill in the art will recognize that the originator 44 and the addressees 48 and 52 are computers coupled to a network 43 such as the Internet. For the sake of completeness, FIG. 5 shows a block diagram of one computer 44 to which is coupled a storage device 45 and from which the computer 44 can read program instructions. The computer 44 executes the program instructions stored in the storage device 45 and it is the program instructions, which when executed will cause the computer 44 to format the e-mail message header 100 to have the new data fields 40 and 42. Similarly, for the addressee computers 48 and 52, program instructions cause the addressee computers to recognize the presences and contents of the new message fields 40 and 42 and format and send blind notification of forward messages to a message originating computer/addressee.

Those of ordinary skill in the art will recognize that the addition of the message fields 40 and 42 is accomplished by way of a mail program such as OUTLOOK® adding the new message fields to the header using programming routines well known in the art. The ability to add the new message fields 40 and 42 is perhaps best enabled by adding a user interface "switch" or dialog box, the selection which causes the mail program running on a computer to add the fields 40 and 42 to an e-mail message header. The presence of the message fields 40 and 42 is also best detected by an e-mail program using routines well known in the art and which enable the e-mail program create and cause the transmission of the blind notification of forward messages to be sent out on the network 43 as described above.

Well known embodiments of computer program storage media/devices 45 include magnetic disk, optical disk and semiconductor RAM, ROM, DRAM, EEPROM et al.

Finally, it should be noted that while the embodiments described above relate to and contemplate message text, the invention disclosed above and claimed hereinafter also encompasses the blind notification of the retransmission of other information either forming an e-mail message or attached to such a message, such as movies and audio files attached to an e-mail message, regardless of the format of such files (MP3, MPEG, JEPG, et al.). Thus, the blind notification of forward message transmission described above can be used to guard against unauthorized acts of copying and/or distributing copyrighted material via the Internet. The concepts described above and the terms "e-mail" and "message" should be construed to include files as e-mail or part of an e-mail, whether they are attachments to an e-mail message or sent themselves. Multipurpose Internet Mail Extensions or MIME is described in RFC's 2045-2049.

The apparatus and method depicted in the figures and described above are but examples of preferred embodiments of the invention claimed below. Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. A method of notifying an e-mail message originator of the e-mail message's re-transmission by a first addressee to a second addressee comprising the step of:
   a. formatting said e-mail message to include a forwarded message data field, which marks said e-mail message as requiring a notice to be sent to the originator when said e-mail message is re-transmitted by said first addressee to a second addressee,
   wherein the second addressee is unaware that the notice is sent to the originator;
   wherein said first addressee is at least one addressee in a "TO" message data field of said e-mail message;
   wherein said notice sent to the originator is a blind notification of the forwarded message;
   wherein the notice is sent to the originator by a computer that received the forwarded e-mail message; and
   wherein the forwarded e-mail message comprises:
      a header field and contents.

2. The method of claim 1 wherein the step of formatting said e-mail message to include a forwarded message data field, further comprises the step of selecting a switch on a user interface of a mail program.

3. The method of claim 1 wherein the step of formatting said e-mail message to include a forwarded message data field further comprises the step of:
   a. formatting said e-mall message such that it has a forwarded message notification data field in a header portion of said e-mail message.

4. The method of claim 1 wherein the step of formatting said e-mail message to include a forwarded message data field further comprises the step of:
   a. formatting the header field compliant with RFC 2822, section 2.2.

5. In an e-mail message having an originator and transmitted to a first addressee over a data network, a method of notifying the e-mail message originator of the e-mail message's re-transmission to a second addressee comprising the steps of:
   a. formatting said e-mail message so that it includes a forwarded message data field which marks said e-mail message to have its re-transmission notified to its originator; and
   b. formatting said e-mail message so that the forwarded message data will cause a notification message to be sent to the e-mail message originator via the data network when the message is received by the second addressee, wherein the second addressee is unaware that the notification message is sent to the e-mail message originator, and wherein said second addressee is at least one addressee in a "TO" message data field of said e-mail message;
   wherein said notification message sent to the e-mail message originator is a blind notification of the forwarded message;
   wherein the notification message is sent to the originator by a computer that received the forwarded e-mail message; and
   wherein the forwarded e-mail message comprises:
      a header field and contents.

6. The method of claim 5 wherein the step of formatting said e-mail message so that it includes a forwarded message data field, which marks said e-mail message to addressees as requiring its re-transmission to a second addressee to be notified to its originator, further comprises the step of selecting a switch on a user interface of a mail program.

7. The method of claim 5 wherein the step of formatting said e-mail message so that it includes a forwarded message data further comprises the step of:
   a. formatting said e-mail message such that it has a forwarded message notification data field in a header portion of said e-mail message.

8. The method of claim 5 wherein the step of formatting said e-mail message so that it includes a forwarded message data field further comprises the step of:
   a. formatting the header field compliant with RFC 2822, section 2.2.

9. A method of notifying an e-mail message originator of a re-transmission of an e-mail message created by said e-mail message originator sent to a first addressee, when said e-mail message is re-transmitted by the first addressee to a second addressee via a data network, said method comprising the steps of:
   a. receiving the e-mail message having a forwarded message data field, and contents of which specify to a mail program that the re-transmission of said e-mail message to a second addressee is to be accompanied by the re-transmission of a notice to the e-mail originator, wherein the second addressee is unaware that the notice is sent to the e-mail originator, and wherein said first addressee is at least one addressee in a "TO" message data field of said e-mail message;
   b. determining if the contents of said forwarded e-mail message data field identifies said e-mall message as requiring transmission of the notification message back to said originator if said e-mail message is re-transmitted to a second addressee via the data network; and
   c. sending the notification message as a blind notification message, of the forwarded e-mail message, to said e-mail originator via said data network when said e-mail message is received by the second addressee,
   wherein the notification message is sent to the originator by a computer that received the forwarded e-mail message; and
   wherein the forwarded e-mail message comprises:
      a header field and contents.

10. The method of claim 9 wherein the step of receiving said e-mail message further comprises the step of:

a. receiving the e-mail message having a blind notification of forward message data field in a header portion of said e-mail message.

11. The method of claim 9 wherein the step of receiving said e-mail message further comprises the step of:
  a. receiving the e-mail message having a blind notification of forward message data field compliant with RFC 2822, section 2.2.

12. A computer storage medium storing computer program instructions, which when executed cause a computer to:
  a. send notification message back to an originator of said e-mail message when said e-mail message is forwarded by a first addressee of said e-mail message to a second addressee, wherein the second addressee is unaware that the notification message is sent to the originator, and wherein said first addressee is at least one addressee in a "TO" message data field of said e-mail message;
  wherein said notification message sent to the originator is a blind notification of the forwarded message; and
  wherein the notification message is sent to the originator by a computer that received the forwarded e-mail message;
  wherein the forwarded e-mail message comprises:
    a header field and contents.

13. The computer storage medium of claim 12 further comprising program instructions, which when executed cause said computer to:
  a. add a blind notification message to the forwarded e-mail message header field, complaint with RFC 2822, section 2.2, contents of said forwarded data e-mail message header field indicating to mail programs that receive said e-mail message to recognize said e-mail message as requiring to send a blind notification message to the originator whenever said e-mail message is forwarded.

14. The computer storage medium of claim 12 wherein said medium comprises at least one of:
  a. magnetic disk;
  b. optical disk; and
  c. a semiconductor storage device.

15. The computer storage medium of claim 12, further comprising a computer, operatively coupled to said storage medium, said computer being capable of reading and executing said program instructions.

16. A method of notifying an e-mail message originator of the e-mail message's re-transmission by a first addressee to a second addressee comprising the step of:
  a. formatting said e-mail message to include a forwarded message data field, which marks said e-mail message as requiring a notice to be sent to the originator when said e-mail message is re-transmitted by said first addressee to a second addressee, wherein the second addressee is unaware that the notice is sent to the originator, and wherein said first addressee is in a message data field of said e-mail message other than a blind carbon copy (Bcc) message data field;
  wherein said notice sent to the originator is a blind notification of the forwarded message; and
  wherein the notice is sent to the originator by a computer that received the forwarded e-mail message;
  wherein the forwarded e-mail message comprises:
    a header field and contents.

17. In an e-mail message having an originator and transmitted to a first addressee over a data network, a method of notifying the e-mail message originator of the e-mail message's re-transmission to a second addressee comprising the steps of:
  a. formatting said e-mail message so that it includes a forwarded message data field which marks said e-mail message to have its re-transmission notified to its originator;
  b. formatting said e-mail message so that the forwarded message data field will cause a notification message to be sent to the e-mail message originator via the data network when the e-mail message is received by a second addressee, wherein the second addressee is unaware that the notification message is sent to the e-mail message originator, wherein said second addressee is in a message data field of said e-mail message other than a blind carbon copy (Bcc) message data field;
  wherein said notification message sent to the originator is a blind notification of the forwarded message; and
  wherein the notification message is sent to the originator by a computer that received the forwarded e-mail message;
  wherein the forwarded e-mail message comprises:
    a header field and contents.

18. A computer storage medium storing computer program instructions, which when executed cause a computer to:
  a. send a notification message back to an originator of an e-mail message when said e-mail message is forwarded by a first addressee of said e-mail message to a second addressee based on a forwarded message data field which marks said e-mail message to have its re-transmission notified to its originator, wherein the second addressee is unaware that the notification message is sent to the originator, and wherein said first addressee is in a message data field of said e-mail message other than a blind carbon copy (Bcc) message data field;
  wherein said notification message sent to the originator is a blind notification of the forwarded message; and
  wherein the notification message is sent to the originator by a computer that received the forwarded e-mail message;
  wherein the forwarded e-mail message comprises:
    a header field and contents.

* * * * *